US010566146B2

(12) United States Patent
Nishishita et al.

(10) Patent No.: US 10,566,146 B2
(45) Date of Patent: Feb. 18, 2020

(54) ELECTRIC DOUBLE-LAYER CAPACITOR INCLUDING A TERMINAL HAVING A PROTRUDING PORTION IN AN EXTERIOR BODY THEREOF

(71) Applicant: TOKIN CORPORATION, Sendai-shi, Miyagi (JP)

(72) Inventors: Satoshi Nishishita, Sendai (JP); Shinji Miyata, Sendai (JP); Katsuhiro Yoshida, Sendai (JP); Keisuke Oga, Sendai (JP)

(73) Assignee: TOKIN CORPORATION, Tokyo (JP)

( * ) Notice: Subject to any disclaimer, the term of this patent is extended or adjusted under 35 U.S.C. 154(b) by 159 days.

(21) Appl. No.: 15/721,446

(22) Filed: Sep. 29, 2017

(65) Prior Publication Data

US 2018/0108495 A1    Apr. 19, 2018

(30) Foreign Application Priority Data

Oct. 14, 2016    (JP) .................................. 2016-202366

(51) Int. Cl.
*H01G 11/74*    (2013.01)
*H01G 11/78*    (2013.01)
(Continued)

(52) U.S. Cl.
CPC ............. *H01G 11/74* (2013.01); *H01G 11/18* (2013.01); *H01G 11/78* (2013.01); *H01G 11/86* (2013.01); *Y02E 60/13* (2013.01)

(58) Field of Classification Search
CPC ........ H01G 11/74; H01G 11/78; H01G 11/18; H01G 11/86
See application file for complete search history.

(56) References Cited

U.S. PATENT DOCUMENTS

| 5,093,762 A * | 3/1992 | Sato ....................... H01G 9/008 361/502 |
| 2005/0213285 A1* | 9/2005 | Tatezono ............... H01G 9/016 361/502 |

(Continued)

FOREIGN PATENT DOCUMENTS

| JP | S61144650 U | 9/1986 |
| JP | S61001042 A | 1/1987 |

(Continued)

OTHER PUBLICATIONS

Japanese Office Action dated Oct. 2, 2019 (and English translation thereof) issued in Japanese Application No. 2016-202366.

*Primary Examiner* — David M Sinclair
(74) *Attorney, Agent, or Firm* — Holtz, Holtz & Volek PC

(57) ABSTRACT

An electric double-layer capacitor includes a capacitor element, which includes a positive electrode and a negative electrode that face each other in a predetermined direction; a positive plate-like terminal portion connected to one end of the capacitor element in the predetermined direction; a negative plate-like terminal portion connected to another end of the capacitor element in the predetermined direction; and an exterior body encapsulating the capacitor element, the positive plate-like terminal portion, and the negative plate-like terminal portion. The positive and the negative plate-like terminal portions include parts that face each other in the predetermined direction, and at least one protruding portion protrudes from a corresponding one of the parts toward a corner of the exterior body.

8 Claims, 12 Drawing Sheets

(51) Int. Cl.
H01G 11/18 (2013.01)
H01G 11/86 (2013.01)

(56) References Cited

U.S. PATENT DOCUMENTS

| | | | | |
|---|---|---|---|---|
| 2007/0014076 A1* | 1/2007 | Omura | ................... | H01G 9/10 |
| | | | | 361/502 |
| 2010/0014217 A1* | 1/2010 | Kawahara | .............. | H01G 9/012 |
| | | | | 361/523 |
| 2012/0039019 A1* | 2/2012 | Zednickova | ......... | H01G 9/0003 |
| | | | | 361/529 |
| 2012/0092809 A1* | 4/2012 | Tamachi | ................ | H01G 9/155 |
| | | | | 361/502 |

FOREIGN PATENT DOCUMENTS

| | | | |
|---|---|---|---|
| JP | S62268055 A | | 11/1987 |
| JP | 63064351 A | | 3/1988 |
| JP | S63296330 A | | 12/1988 |
| JP | H0399421 U | | 10/1991 |
| JP | H0528024 U | | 4/1993 |
| JP | H0528025 U | | 4/1993 |
| JP | 06151248 A | * | 5/1994 |
| JP | H07050232 A | | 2/1995 |
| JP | 3023627 B2 | | 3/2000 |
| JP | 2000223375 A | * | 8/2000 |
| JP | 2001307968 A | * | 11/2001 |
| JP | 2002100340 A | | 4/2002 |
| JP | 2002252152 A | * | 9/2002 |
| WO | 2008120455 A1 | | 10/2008 |

* cited by examiner

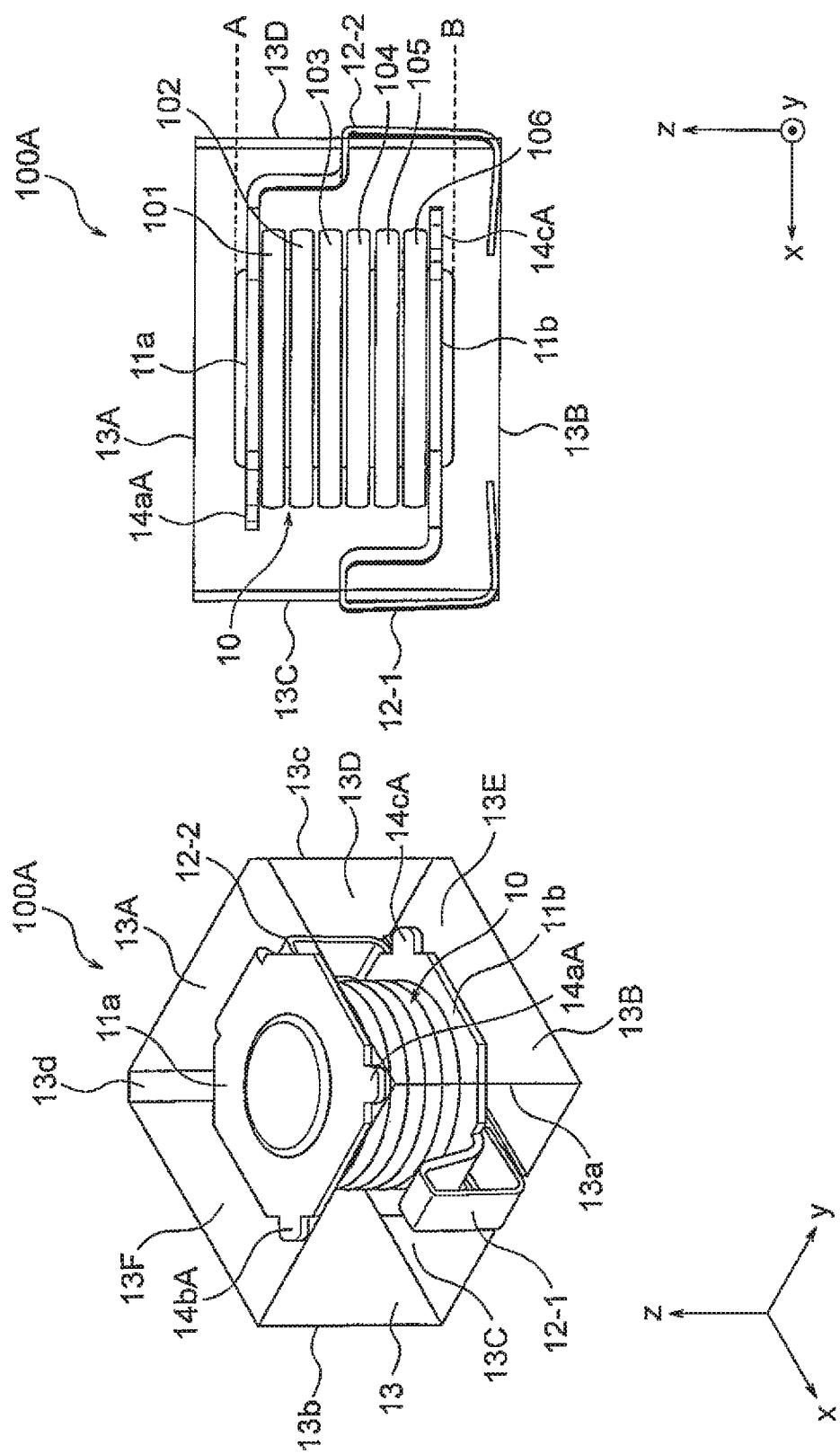

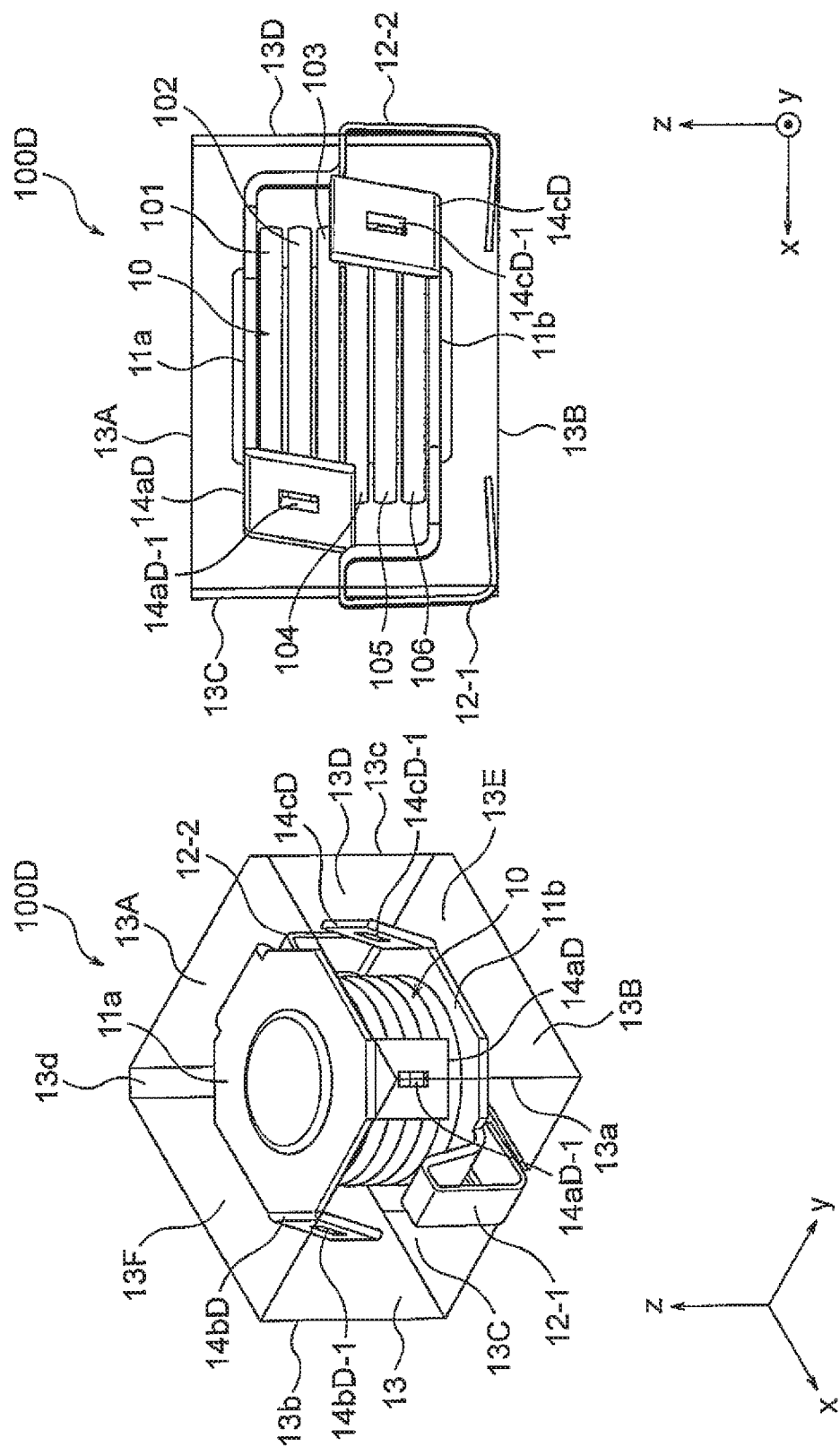

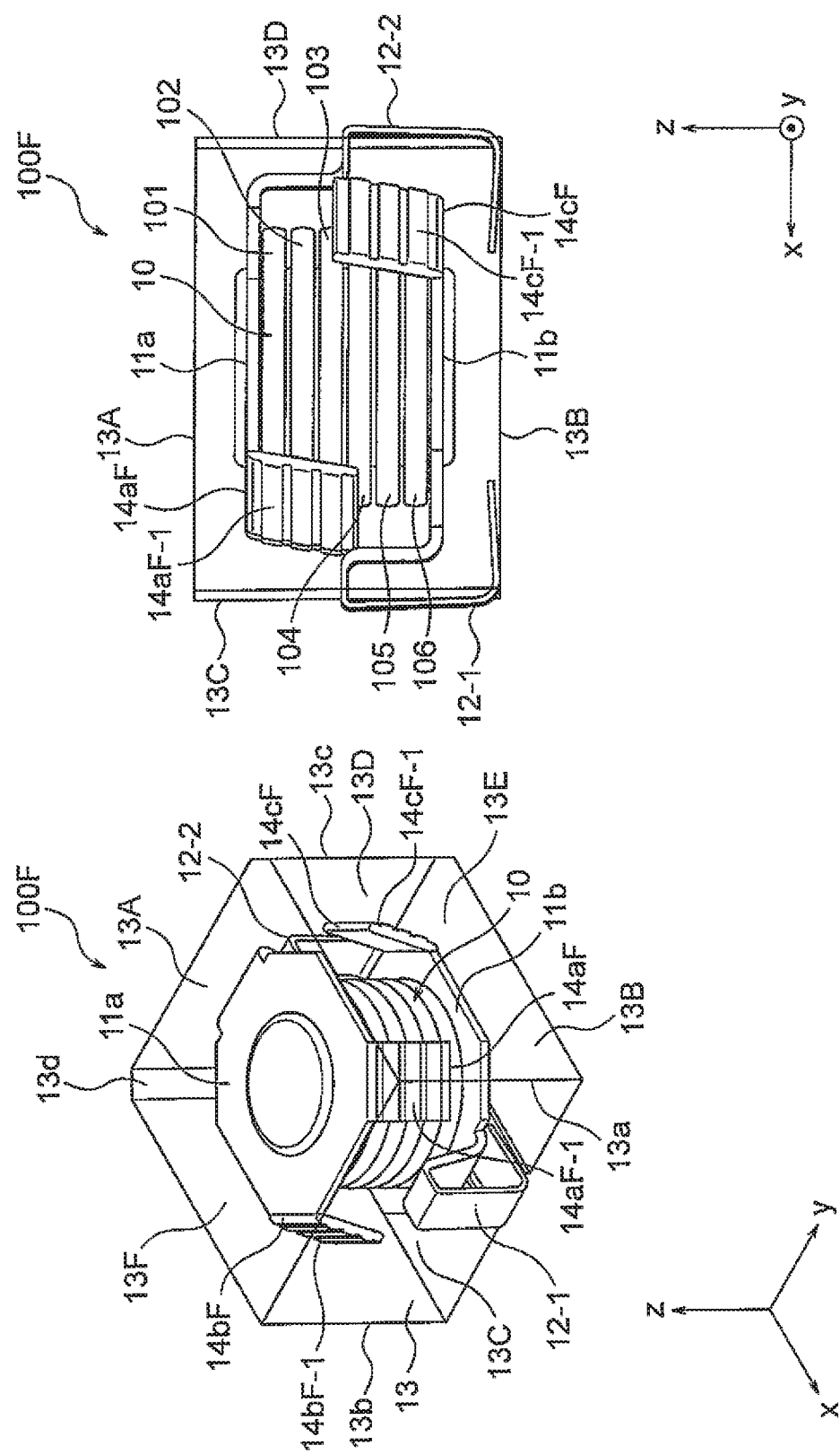

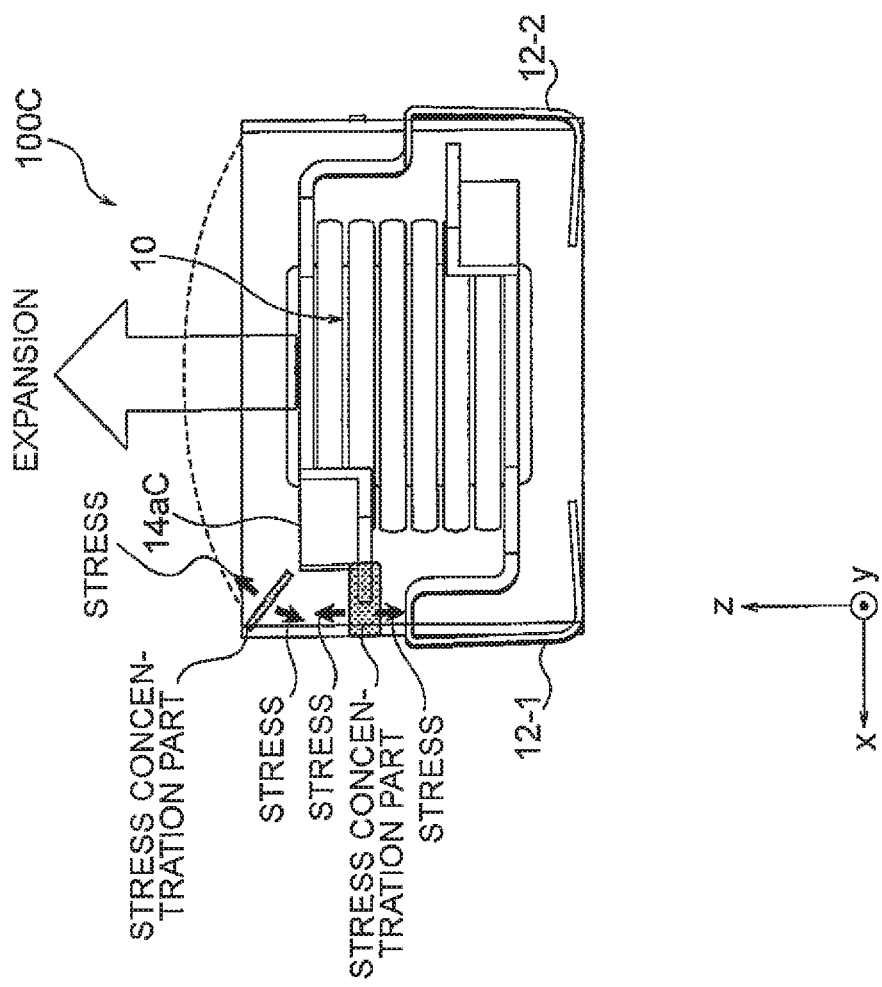
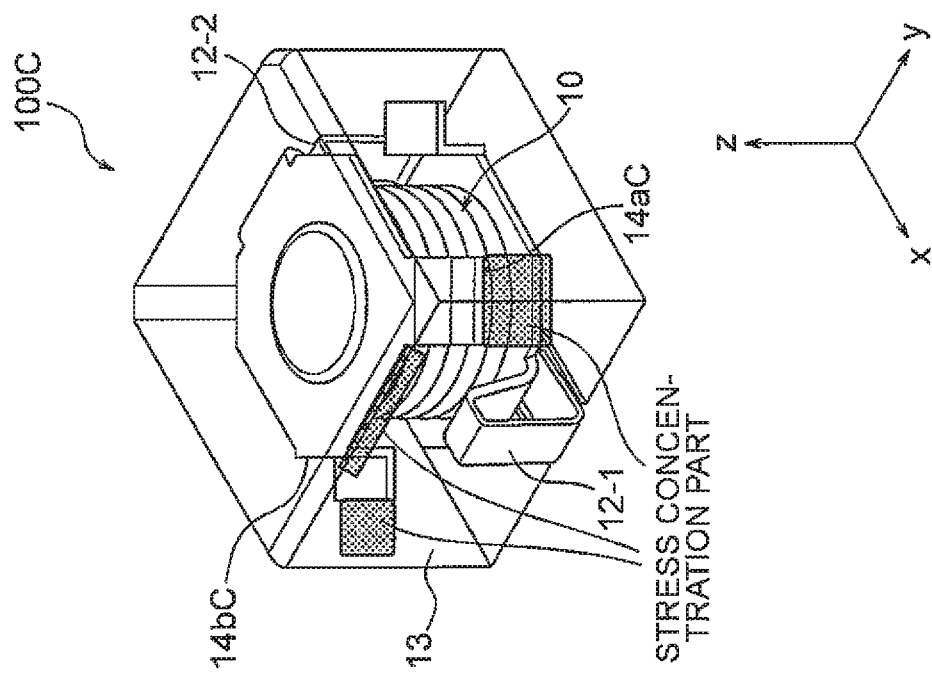
FIG. 7A
FIG. 7B

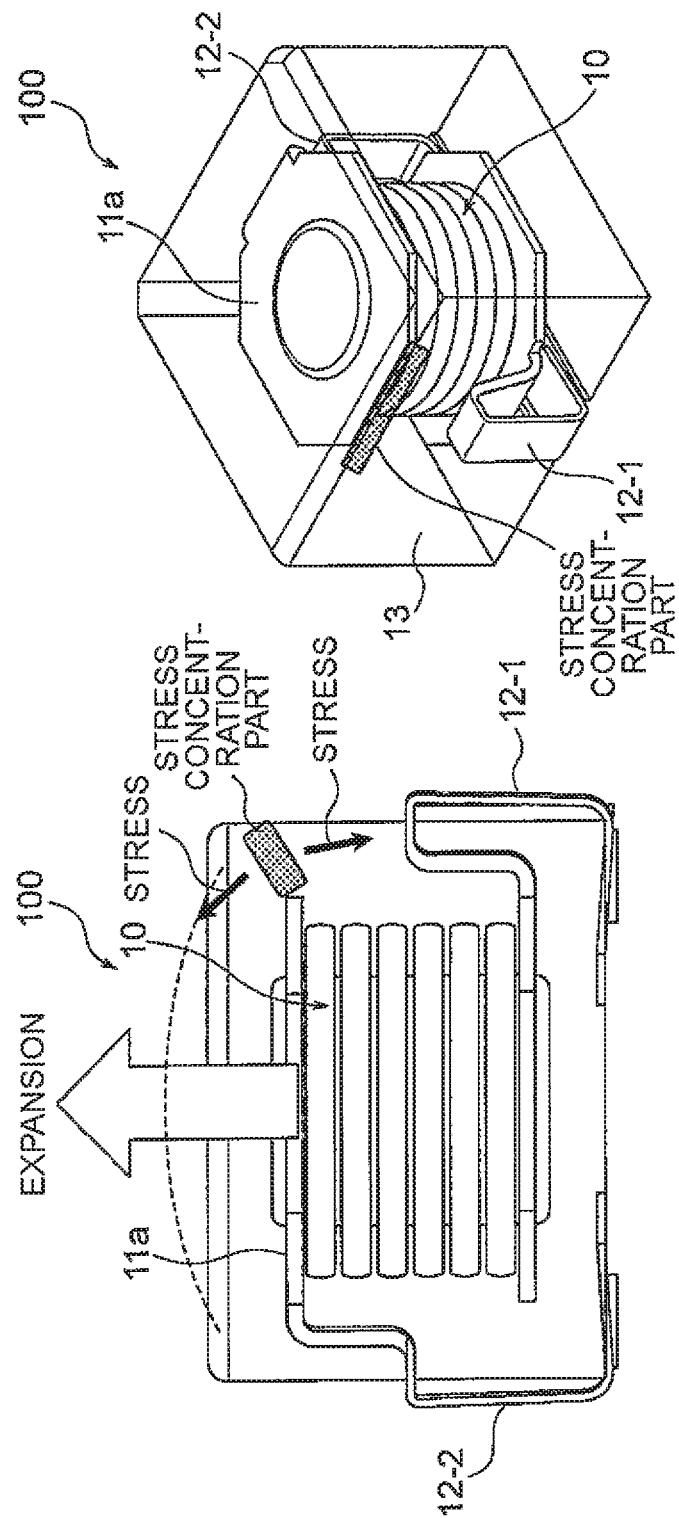
FIG. 12A
RELATED ART
FIG. 12B
RELATED ART

ELECTRIC DOUBLE-LAYER CAPACITOR INCLUDING A TERMINAL HAVING A PROTRUDING PORTION IN AN EXTERIOR BODY THEREOF

This application is based upon and claims the benefit of priority from Japanese Patent Application No. 2016-202366, filed on Oct. 14, 2016, the disclosure of which is incorporated herein in its entirety by reference.

BACKGROUND OF THE INVENTION

1. Field of the Invention

This invention relates to an electric double-layer capacitor.

2. Description of the Related Art

Electric double-layer capacitors are used as auxiliary power sources configured to supply electric power to memories, real time clocks (RTC), and other components that are mounted on industrial machines or consumer electronics, for example. When being mounted by reflow soldering, the electric double-layer capacitor is exposed to high temperature. When a mold resin is used as an exterior material for the electric double-layer capacitor, an electrolytic solution is boiled with heat in reflow soldering and an internal element expands, with the result that the mold resin is sometimes damaged. To cope with this, there have been proposed electric double-layer capacitors having various structures that improve high-temperature resistance of the electric double-layer capacitors.

In Japanese Patent No. 3023627, there is disclosed an electric double-layer capacitor that includes a hook-like terminal for positive and negative electrode plate lead terminals. In the electric double-layer capacitor disclosed in Japanese Patent No. 3023627, the hook-like terminal is provided to one of the positive and negative electrode plate lead terminals, and the other electrode plate lead terminal is sandwiched with the hook-like terminal so that holding force for an element is maintained.

However, the related-art electric double-layer capacitor, in which distances between the electrode plate lead terminals and the exterior wall made of a mold resin vary from place to place, has a possibility that stress concentrates on the part in which the distance is short when the internal element expands in reflow soldering, resulting in a reduction in mechanical strength. For example, Japanese Patent No. 3023627, in which the end portion of the hook-like terminal, which is provided to the electrode plate lead terminal, wraps around to the back surface of the other electrode plate lead terminal, has the following problem. Specifically, the end portion of the hook-like terminal causes stress concentration on the thin exterior of the back surface of the electrode plate lead terminal when the internal element expands in reflow soldering, resulting in a reduction in mechanical strength.

The configuration of Japanese Patent No. 3023627 also has a problem of complicated assembly of the structure in which the electrode plate lead terminal is sandwiched with the hook-like terminal so that the element is compressed in order to prevent the expansion of the internal element.

SUMMARY OF THE INVENTION

It is an object of this invention to provide an electric double-layer capacitor that is easily assembled, and is capable of preventing being damaged in reflow soldering.

An electric double-layer capacitor according to one aspect of this invention comprises a capacitor element, which includes a positive electrode and a negative electrode that face each other in a predetermined direction; a positive plate-like terminal portion, which is connected to one end of the capacitor element in the predetermined direction; a negative plate-like terminal portion, which is connected to another end of the capacitor element in the predetermined direction; and an exterior body, which is configured to encapsulate the capacitor element, the positive plate-like terminal portion, and the negative plate-like terminal portion. The positive plate-like terminal portion and the negative plate-like terminal portion have parts that face each other in the predetermined direction, and at least one protruding portion that protrudes from any one of the parts. The protruding portion has a distal end portion that is located between a first surface that is orthogonal to the predetermined direction and includes an outermost portion of the positive plate-like terminal portion in the predetermined direction, and a second surface that is orthogonal to the predetermined direction and includes an outermost portion of the negative plate-like terminal portion in the predetermined direction.

In an electric double-layer capacitor according to one aspect of this invention, when a difference in a plane orthogonal to the predetermined direction between a distance from a center of gravity of one of the positive plate-like terminal portion, the negative plate-like terminal portion, and the capacitor element to a peripheral surface of the one of the positive plate-like terminal portion, the negative plate-like terminal portion, and the capacitor element, and a distance from the center of gravity of the one of the positive plate-like terminal portion, the negative plate-like terminal portion, and the capacitor element to an exposed exterior body surface of the exterior body is defined as an exterior thickness, the protruding portion is preferably located in a region between the center of gravity and a part of the exposed exterior body surface that has the exterior thickness that is larger than an average value of exterior thicknesses obtained for all around the exterior body with the center of gravity being a reference in the plane.

In an electric double-layer capacitor according to one aspect of this invention, the at least one protruding portion is preferably inclined with respect to the positive plate-like terminal portion and the negative plate-like terminal portion.

In an electric double-layer capacitor according to one aspect of this invention, the at least one protruding portion preferably has at least one bent portion.

In an electric double-layer capacitor according to one aspect of this invention, the at least one protruding portion preferably has at least one hole portion.

In an electric double-layer capacitor according to one aspect of this invention, the at least one protruding portion preferably has at least one narrowed portion.

In an electric double-layer capacitor according to one aspect of this invention, the at least one protruding portion preferably has an uneven portion on a surface thereof.

EFFECT OF THE INVENTION

According to this invention, it is possible to obtain the electric double-layer capacitor that is easily assembled, and is capable of preventing being damaged in reflow soldering.

BRIEF DESCRIPTION OF THE DRAWINGS

FIG. 1A and FIG. 1B are a perspective view and a cross-sectional transparent view, respectively, for schematically illustrating the configuration of an electric double-layer capacitor according to a first embodiment of this invention.

FIG. 4A and FIG. 4B are a perspective view and a cross-sectional transparent view, respectively, for schematically illustrating the configuration of an electric double-layer capacitor according to a fourth embodiment of this invention.

FIG. 6A and FIG. 6B are a perspective view and a cross-sectional transparent view, respectively, for schematically illustrating the configuration of an electric double-layer capacitor according to a sixth embodiment of this invention.

FIG. 7A and FIG. 7B are schematic views for illustrating a part in which stress concentration occurs in the electric double-layer capacitor according to the third embodiment of this invention.

FIG. 12A and FIG. 12B are schematic views for illustrating a part in which stress concentration occurs in the electric double-layer capacitor according to the technology related to this invention.

DESCRIPTION OF THE EMBODIMENTS

[Related Technology]

Figure 11:
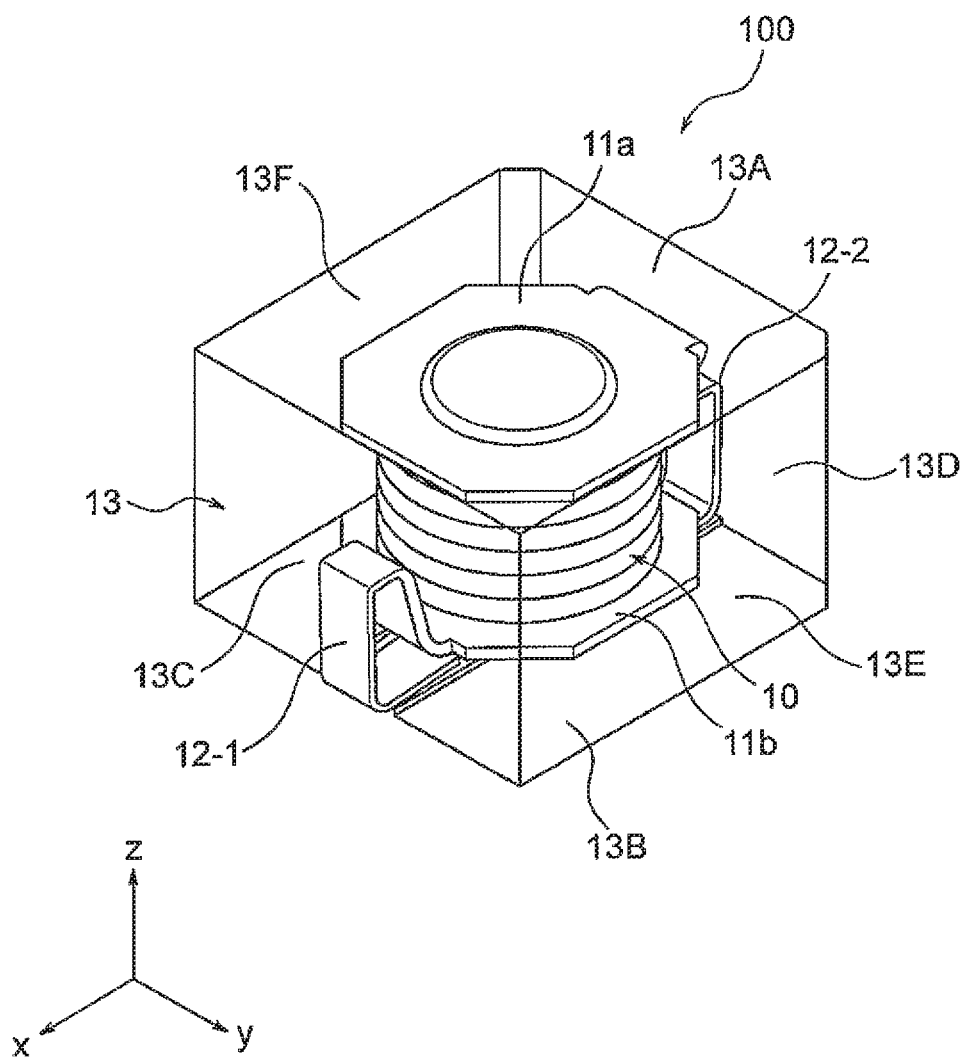
FIG. 11 is a schematic view for illustrating the configuration of an electric double-layer capacitor according to a technology related to this invention.

In order to facilitate the understanding of this invention, a technology related to this invention is first described with reference to FIG. 11, FIG. 12A, and FIG. 12B. FIG. 11 is a schematic view for illustrating the configuration of an electric double-layer capacitor 100 according to the technology related to this invention. FIG. 12A and FIG. 12B are schematic views for illustrating a part in which stress concentration occurs in the electric double-layer capacitor 100.

Here, as illustrated in FIG. 11, FIG. 12A, and FIG. 12B, an orthogonal coordinate system (x, y, z) is used. In the state illustrated in FIG. 11, FIG. 12A, and FIG. 12B, in the orthogonal coordinate system (x, y, z), the x-axis direction is the right and left direction (width direction), the y-axis direction is the front and rear direction (depth direction), and the z-axis direction is the up and down direction (height direction).

As illustrated in FIG. 11, the electric double-layer capacitor 100 includes a capacitor element 10, a positive plate-like terminal portion 11a, a negative plate-like terminal portion 11b, a first lead-out terminal portion 12-1, a second lead-out terminal portion 12-2, and an exterior body 13.

The capacitor element 10 includes a unit cell that includes a polarizable electrode, an electrolytic solution, a separator, a gasket, and a current collector, and is a laminated body of one or N (N is an integer of 2 or more) unit cells. The capacitor element 10 has an upper surface and a lower surface that face each other in a predetermined direction. The upper surface and the lower surface are also referred to as a first surface and a second surface, respectively. Further, in the following description, the predetermined direction is also referred to as the up and down direction.

The positive plate-like terminal portion 11a is a plate-like positive electrode that is formed on the upper surface of the capacitor element 10, and has an octagonal shape. The positive plate-like terminal portion 11a is made of SUS (stainless steel) or SPCC (iron), for example. Further, the surface of the positive plate-like terminal portion 11a is plated with any one of, for example, Ni (nickel), Cu (copper), and Sn (tin) in order to prevent rust and other phenomena and reduce a contact resistance between the positive plate-like terminal portion 11a and the capacitor element 10. The negative plate-like terminal portion 11b is a plate-like negative electrode that is formed on the lower surface of the capacitor element 10, and has a similar structure to that of the positive plate-like terminal portion 11a.

The positive plate-like terminal portion 11a and the negative plate-like terminal portion 11b sandwich the capacitor element 10 in the up and down direction to compress the capacitor element 10. Further, the positive plate-like terminal portion 11a and the negative plate-like terminal portion 11b respectively supply electric charges stored in the capacitor element 10 to the first lead-out terminal portion 12-1 and the second lead-out terminal portion 12-2, which are described later.

The first lead-out terminal portion 12-1 and the second lead-out terminal portion 12-2 are formed to the negative plate-like terminal portion 11b and the positive plate-like terminal portion 11a, respectively, and are led out of the electric double-layer capacitor 100. That is, the first lead-out terminal portion 12-1 and the second lead-out terminal portion 12-2 supply the electric charges stored in the capacitor element 10 to members outside the electric double-layer capacitor 100.

The exterior body 13 is made of a thermoplastic resin, for example. Examples of the thermoplastic resin include polybutylene terephthalate (PBT) and polyphenylene sulfide (PPS). Further, the exterior body 13 is a rectangular parallelepiped having an upper surface 13A, a lower surface 13B, a left surface 13C, a right surface 13D, a front surface 13E, and a rear surface 13F. In addition, the exterior body 13 is formed in a manner that the four corners of the upper surface 13A face the respective four sides of the positive plate-like terminal portion 11a, and the four corners of the lower surface 13B face the respective four sides of the negative plate-like terminal portion 11b.

FIG. 12A and FIG. 12B are schematic views for illustrating stress that the electric double-layer capacitor 100 according to the related technology receives. The directions of stress are illustrated in FIG. 12A, and a part in which stress concentration occurs is illustrated in FIG. 12B.

As illustrated in FIG. 12A, in the electric double-layer capacitor 100, the electrolytic solution inside the capacitor element 10 is boiled with heat for mounting by reflow soldering to increase the internal pressure of the capacitor element 10, with the result that the capacitor element 10 expands in the vertical direction from the positive plate-like terminal portion 11a, for example. Due to this expansion, the exterior body 13 receives stress from the positive plate-like terminal portion 11a. In the case of the electric double-layer capacitor 100, as illustrated in FIG. 12B, stress concentrates on a part of the exterior body 13 in which a distance between the positive plate-like terminal portion 11a and the exterior wall of the exterior body 13 is short, and the exterior body 13 may thus be damaged in the stress applied part. That is, the electric double-layer capacitor 100 has a problem of having low resistance against reflow soldering.

Now, embodiments of this invention are described in detail with reference to FIG. 1A to FIG. 6B. In order to avoid repetition to simplify the description, the same or corresponding portions are denoted by the same reference symbols in the respective figures, and the description thereof is omitted as appropriate.

First Embodiment

FIG. 1A and FIG. 1B are schematic views for illustrating the configuration of an electric double-layer capacitor 100A according to a first embodiment of this invention. FIG. 1A is a perspective view, and FIG. 1B is a cross-sectional transparent view of the electric double-layer capacitor 100A of FIG. 1A when viewed from the front and rear direction.

Here, as illustrated in FIG. 1A and FIG. 1B, an orthogonal coordinate system (x, y, z) is used. In the state illustrated in FIG. 1A and FIG. 1B, in the orthogonal coordinate system (x, y, z), the x-axis direction is the right and left direction (width direction), the y-axis direction is the front and rear direction (depth direction), and the z-axis direction is the up and down direction (height direction).

The electric double-layer capacitor 100A according to the first embodiment includes a capacitor element 10, a positive plate-like terminal portion 11a, a negative plate-like terminal portion 11b, a first lead-out terminal portion 12-1, a second lead-out terminal portion 12-2, an exterior body 13, a first protruding portion 14aA, a second protruding portion 14bA, a third protruding portion 14cA, and a fourth protruding portion (not shown).

In the first embodiment, the capacitor element 10 includes a first unit cell 101, a second unit cell 102, a third unit cell 103, a fourth unit cell 104, a fifth unit cell 105, and a sixth unit cell 106. The number of unit cells included in the capacitor element 10 is not particularly limited, and it is only necessary that the capacitor element 10 include one or N (N is an integer of 2 or more) unit cells depending on desired characteristics.

The positive plate-like terminal portion 11a is a plate-like positive electrode that is formed on the upper surface of the capacitor element 10, and has an octagonal shape. The shape of the positive plate-like terminal portion 11a illustrated in FIG. 1A and FIG. 1B is only exemplary, and this invention is not limited thereto. In the first embodiment, the positive plate-like terminal portion 11a may have another polygonal shape as long as a predetermined distance or more can be secured as a distance from the positive plate-like terminal portion 11a to the exterior wall of the exterior body 13. Specifically, the positive plate-like terminal portion 11a preferably has an M-sided polygonal shape (M is an even number of 8 or more) that is substantially circular. The negative plate-like terminal portion 11b is a plate-like negative electrode that is formed on the lower surface of the capacitor element 10, and has a similar structure to that of the positive plate-like terminal portion 11a. Referring to FIG. 1B, the positive plate-like terminal portion 11a has a first surface A. The first surface A is a surface that includes the outermost portion of the positive plate-like terminal portion 11a in a predetermined direction. The negative plate-like terminal portion 11b has a second surface B. The second surface B is a surface that includes the outermost portion of the negative plate-like terminal portion 11b in the predetermined direction. Here, the predetermined direction for the positive plate-like terminal portion 11a and the negative plate-like terminal portion 11b is a direction in which the positive plate-like terminal portion 11a and the negative plate-like terminal portion 11b face each other, for example. Also in second to sixth embodiments of this invention, which are described later, the positive plate-like terminal portion 11a and the negative plate-like terminal portion 11b have the first surface A and the second surface B, respectively.

The protruding portion having a distal end portion that is located between the first surface that is orthogonal to the predetermined direction and includes the outermost portion of the positive plate-like terminal portion in the predetermined direction, and the second surface that is orthogonal to the predetermined direction and includes the outermost portion of the negative plate-like terminal portion in the predetermined direction. With this configuration, there is provided an effect of preventing a reduction in mechanical strength as described in, for example, Japanese Patent No. 3023627 in which the end portion of the hook-like terminal, which is provided to the electrode plate lead terminal, wraps around to the back surface of the other electrode plate lead terminal, and the end portion of the hook-like terminal causes stress concentration on the thin exterior of the back surface of the electrode plate lead terminal when the internal element expands in reflow soldering.

Each of the first protruding portion 14aA and the second protruding portion 14bA is formed in any one of the sides of the positive plate-like terminal portion 11a that face the corners of the upper surface 13A of the exterior body 13. Further, the first protruding portion 14aA and the second protruding portion 14bA protrude parallel to the positive plate-like terminal portion 11a toward the edges of the exterior body 13 in the up and down direction, which face the first protruding portion 14aA and the second protruding portion 14bA. Specifically, the first protruding portion 14aA is formed so as to protrude from the front left end portion of the positive plate-like terminal portion 11a toward a front left edge 13a of the exterior body 13 that faces the first protruding portion 14aA. Further, the second protruding portion 14bA is formed so as to protrude from the rear left end portion of the positive plate-like terminal portion 11a toward a rear left edge 13b of the exterior body 13 that faces the second protruding portion 14bA. Here, in order to improve the resistance against reflow soldering, the first protruding portion 14aA and the second protruding portion 14bA preferably protrude in parts in which the distance from the positive plate-like terminal portion 11a to the exterior wall of the exterior body 13 is long (parts with high strength).

Each of the third protruding portion 14cA and the fourth protruding portion is formed in any one of the sides of the negative plate-like terminal portion 11b that face the corners of the lower surface 13B of the exterior body 13. Further, the third protruding portion 14cA and the fourth protruding portion protrude parallel to the negative plate-like terminal portion 11b toward the edges of the exterior body 13 in the up and down direction, which face the third protruding portion 14cA and the fourth protruding portion. Specifically, the third protruding portion 14cA is formed so as to protrude from the front right end portion of the negative plate-like terminal portion 11b toward a front right edge 13c of the exterior body 13. The fourth protruding portion is formed so as to protrude from the rear right end portion of the negative plate-like terminal portion 11b toward a rear right edge 13d of the exterior body 13. Similarly to the first protruding portion 14aA and the second protruding portion 14bA, the third protruding portion 14cA and the fourth protruding portion preferably protrude in parts in which a distance from the negative plate-like terminal portion 11b to the exterior wall of the exterior body 13 is long (parts with high strength). In the first embodiment, the four protruding portions are formed, but this invention is not limited thereto. It is only necessary that at least one protruding portion be formed in any one of the positive plate-like terminal portion 11a and the negative plate-like terminal portion 11b.

With this configuration, the first protruding portion 14aA, the second protruding portion 14bA, the third protruding portion 14cA, and the fourth protruding portion are formed in positions other than the parts on which stress concentrates, that is, the parts in which the distances from the positive plate-like terminal portion 11a and the negative plate-like terminal portion 11b to the exterior wall of the exterior body 13 are short. Consequently, stress that is applied in reflow soldering can be distributed, and the resistance against reflow soldering of the electric double-layer capacitor 100A can thus be improved. Further, due to the provision of the protruding portions, a contact area with the exterior body 13 can be increased, and the anchoring effect can be obtained by an increase in area in which the exterior body 13 is anchored to the positive plate-like terminal portion 11a and the negative plate-like terminal portion 11b. As a result, the mechanical strength can be increased.

That is, in the first embodiment of this invention, the distal end portion of each protruding portion, on which stress tends to concentrate when the internal element expands in reflow soldering, is located in the region of the exterior body 13 that is thicker than those for the parts of the positive plate-like terminal portion 11a and the negative plate-like terminal portion 11b other than the protruding portions. As a result, stress that is generated due to the expansion of the internal element in reflow soldering can be distributed in the thick exterior body region in which the exterior body 13 has high strength, and it is possible to prevent damage in reflow soldering. This also applies to the second to sixth embodiments, which are described later.

Further, a difference between a distance from the center of gravity of the positive plate-like terminal portion 11a, the negative plate-like terminal portion 11b, or the capacitor element 10 to its peripheral surface, and a distance from the center of gravity in question to the surface of the exterior body 13 in a plane in a direction orthogonal to the direction in which the positive plate-like terminal portion 11a and the negative plate-like terminal portion 11b face each other is defined as an exterior thickness. In this case, the above-mentioned four protruding portions are preferably located in regions with exterior thicknesses that are larger than the average value of exterior thicknesses obtained for all around the exterior body 13 with the position of the center of gravity being a reference in the plane. When this structure is employed, the distal end portion of each protruding portion is located in the thicker corner region of the exterior body 13, in which the exterior body 13 has higher strength, and it is possible to more positively prevent damage in reflow soldering. This also applies to the second to sixth embodiments, which are described later.

Second Embodiment

Figures 2A, 2B:
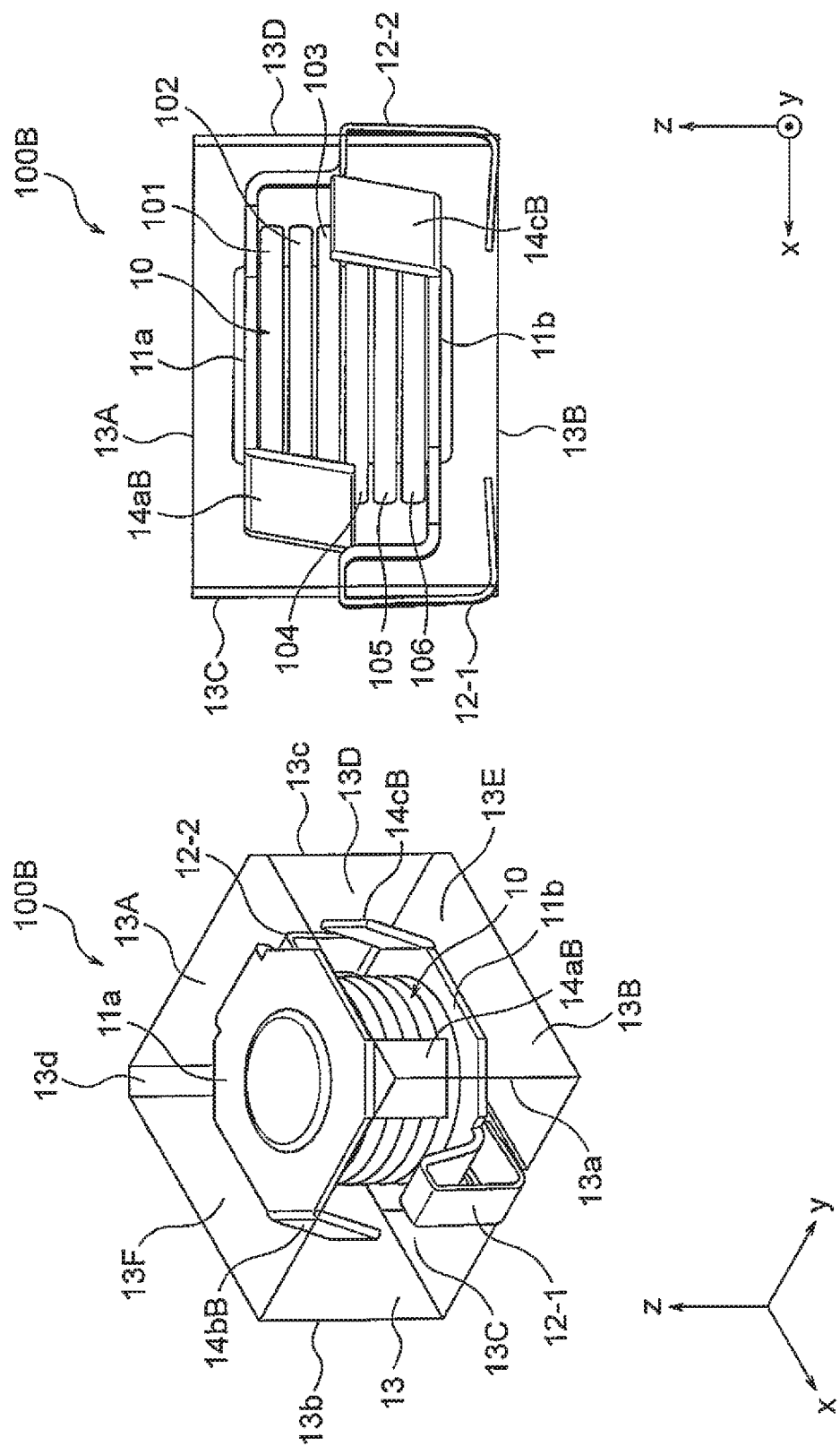
FIG. 2A and FIG. 2B are a perspective view and a cross-sectional transparent view, respectively, for schematically illustrating the configuration of an electric double-layer capacitor according to a second embodiment of this invention.

FIG. 2A and FIG. 2B are schematic views for illustrating the configuration of an electric double-layer capacitor 100B according to a second embodiment of this invention. FIG. 2A is a perspective view, and FIG. 2B is a cross-sectional transparent view of the electric double-layer capacitor 100B of FIG. 2A when viewed from the front and rear direction.

Here, as illustrated in FIG. 2A and FIG. 2B, an orthogonal coordinate system (x, y, z) is used. In the state illustrated in FIG. 2A and FIG. 2B, in the orthogonal coordinate system (x, y, z), the x-axis direction is the right and left direction (width direction), the y-axis direction is the front and rear direction (depth direction), and the z-axis direction is the up and down direction (height direction).

The electric double-layer capacitor 100B includes a capacitor element 10, a positive plate-like terminal portion 11a, a negative plate-like terminal portion 11b, a first lead-out terminal portion 12-1, a second lead-out terminal portion 12-2, an exterior body 13, a first protruding portion 14aB, a second protruding portion 14bB, a third protruding portion 14cB, and a fourth protruding portion (not shown).

The first protruding portion 14aB and the second protruding portion 14bB, each of which has a flat plate-like shape, are protruding portions of the positive plate-like terminal portion 11a that are formed to be inclined diagonally downward with respect to the positive plate-like terminal portion 11a. Specifically, the first protruding portion 14aB is a protruding portion that protrudes toward a front left edge 13a of the exterior body 13, and the second protruding portion 14bB is a protruding portion that protrudes toward a rear left edge 13b of the exterior body 13. The third protruding portion 14cB and the fourth protruding portion, each of which has a flat plate-like shape, are protruding portions of the negative plate-like terminal portion 11b that are formed to be inclined diagonally upward with respect to the negative plate-like terminal portion 11b. Specifically, the third protruding portion 14cB is a protruding portion that protrudes toward a front right edge 13c of the exterior body 13. Further, the fourth protruding portion is a protruding portion that protrudes toward a rear right edge 13d of the exterior body 13. In the second embodiment, the first protruding portion 14aB, the second protruding portion 14bB, the third protruding portion 14cB, and the fourth protruding portion are each inclined with respect to the positive plate-like terminal portion 11a or the negative plate-like terminal portion 11b, but this invention is not limited thereto. In the second embodiment, for example, only the first protruding portion 14aB may be formed to be inclined, and the second protruding portion 14bB, the third protruding portion 14cB, and the fourth protruding portion may be formed in parallel to the positive plate-like terminal portion 11a and the negative plate-like terminal portion 11b. In short, the first protruding portion 14aB, the second protruding portion 14bB, the third protruding portion 14cB, and the fourth protruding portion may be formed at different angles. Further, the first protruding portion 14aB, the second protruding portion 14bB, the third protruding portion 14cB, and the fourth protruding portion may have different sizes.

Third Embodiment

Figures 3A, 3B:
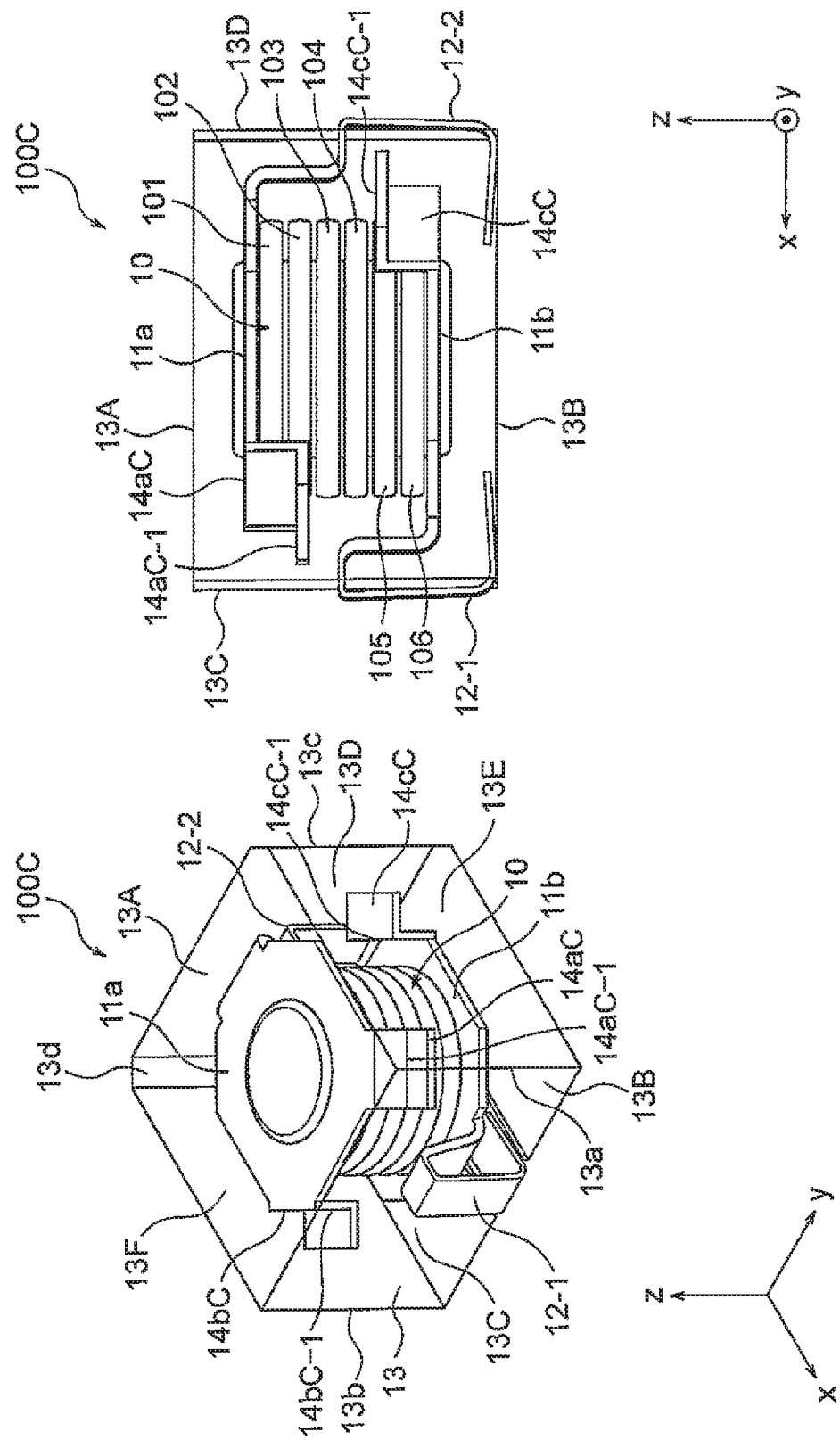
FIG. 3A and FIG. 3B are a perspective view and a cross-sectional transparent view, respectively, for schematically illustrating the configuration of an electric double-layer capacitor according to a third embodiment of this invention.

FIG. 3A and FIG. 3B are schematic views for illustrating the configuration of an electric double-layer capacitor 100C according to a third embodiment of this invention. FIG. 3A is a perspective view, and FIG. 3B is a cross-sectional transparent view of the electric double-layer capacitor 100C of FIG. 3A when viewed from the front and rear direction.

Here, as illustrated in FIG. 3A and FIG. 3B, an orthogonal coordinate system (x, y, z) is used. In the state illustrated in FIG. 3A and FIG. 3B, in the orthogonal coordinate system (x, y, z), the x-axis direction is the right and left direction (width direction), the y-axis direction is the front and rear direction (depth direction), and the z-axis direction is the up and down direction (height direction).

The electric double-layer capacitor 100C according to the third embodiment includes a capacitor element 10, a positive plate-like terminal portion 11a, a negative plate-like terminal portion 11b, a first lead-out terminal portion 12-1, a second lead-out terminal portion 12-2, an exterior body 13, a first protruding portion 14aC, a second protruding portion 14bC, a third protruding portion 14cC, and a fourth protruding portion (not shown).

The first protruding portion 14aC and the second protruding portion 14bC of the positive plate-like terminal portion 11a each vertically protrude in the downward direction from the positive plate-like terminal portion 11a, and are bent by 90° so that their distal end portions are parallel to the positive plate-like terminal portion 11a. Specifically, the first protruding portion 14aC has a first bent portion 14aC-1 in which the first protruding portion 14aC is bent by 90° so that its distal end portion is parallel to the positive plate-like terminal portion 11a. Further, the second protruding portion 14bC has a second bent portion 14bC-1 in which the second protruding portion 14bC is bent by 90° so that its distal end portion is parallel to the positive plate-like terminal portion 11a. The third protruding portion 14cC and the fourth protruding portion of the negative plate-like terminal portion 11b each vertically protrude in the upward direction from the negative plate-like terminal portion 11b, and are bent by 90° so that their distal end portions are parallel to the negative plate-like terminal portion 11b. Specifically, the third protruding portion 14cC has a third bent portion 14cC-1 in which the third protruding portion 14cC is bent so that its distal end portion is parallel to the negative plate-like terminal portion 11b. Further, the fourth protruding portion has a fourth bent portion (not shown) in which the fourth protruding portion is bent by 90° so that its distal end portion is parallel to the negative plate-like terminal portion 11b. In short, the first protruding portion 14aC, the second protruding portion 14bC, the third protruding portion 14cC, and the fourth protruding portion each have one bent portion. Here, the first protruding portion 14aC, the second protruding portion 14bC, the third protruding portion 14cC, and the fourth protruding portion are formed in consideration of the fact that, in the electric double-layer capacitor 100C, stress is applied on the positive plate-like terminal portion 11a and the negative plate-like terminal portion 11b in the vertical direction. The first protruding portion 14aC, the second protruding portion 14bC, the third protruding portion 14cC, and the fourth protruding portion each have formed thereto the surface that is perpendicular to the stress direction, and hence stress can be distributed to parts with high resin strength, that is, parts in which a distance from a stress application part to the exterior wall of the exterior body 13 is long. As a result, the exterior body 13 can be prevented from being damaged. In the third embodiment, the first protruding portion 14aC, the second protruding portion 14bC, the third protruding portion 14cC, and the fourth protruding portion each have one bent portion, but this invention is not limited thereto. In the third embodiment, for example, only the first protruding portion 14aC may have the bent portion. Further, the first protruding portion 14aC, the second protruding portion 14bC, the third protruding portion 14cC, and the fourth protruding portion may each have a plurality of bent portions or a different number of bent portions.

Fourth Embodiment

FIG. 4A and FIG. 4B are schematic views for illustrating the configuration of an electric double-layer capacitor 100D according to a fourth embodiment of this invention. FIG. 4A is a perspective view, and FIG. 4B is a cross-sectional transparent view of the electric double-layer capacitor 100D of FIG. 4A when viewed from the front and rear direction.

Here, as illustrated in FIG. 4A and FIG. 4B, an orthogonal coordinate system (x, y, z) is used. In the state illustrated in FIG. 4A and FIG. 4B, in the orthogonal coordinate system (x, y, z), the x-axis direction is the right and left direction (width direction), the y-axis direction is the front and rear direction (depth direction), and the z-axis direction is the up and down direction (height direction).

The electric double-layer capacitor 100D according to the fourth embodiment includes a capacitor element 10, a positive plate-like terminal portion 11a, a negative plate-like terminal portion 11b, a first lead-out terminal portion 12-1, a second lead-out terminal portion 12-2, an exterior body 13, a first protruding portion 14aD, a second protruding portion 14bD, a third protruding portion 14cD, and a fourth protruding portion (not shown).

As in the second embodiment, the first protruding portion 14aD and the second protruding portion 14bD, each of which has a flat plate-like shape, are protruding portions of the positive plate-like terminal portion 11a that are formed to be inclined diagonally downward with respect to the positive plate-like terminal portion 11a. Specifically, the first protruding portion 14aD protrudes toward a front left edge 13a of the exterior body 13, and has a substantially quadrangular first hole portion 14aD-1. Further, the second protruding portion 14bD protrudes toward a rear left edge 13b of the exterior body 13, and has a substantially quadrangular second hole portion 14bD-1. As in the second embodiment, the third protruding portion 14cD and the fourth protruding portion, each of which has a flat plate-like shape, are protruding portions of the negative plate-like terminal portion 11b that are formed to be inclined diagonally upward with respect to the negative plate-like terminal portion 11b. Specifically, the third protruding portion 14cD protrudes toward a front right edge 13c of the exterior body 13, and has a substantially quadrangular third hole portion 14cD-1. Further, the fourth protruding portion protrudes toward a rear right edge 13d of the exterior body 13, and has a substantially quadrangular fourth hole portion (not shown). In short, the fourth embodiment is a mode in which each protruding portion of the second embodiment has a hole portion. With this configuration, large contact areas are secured between the exterior body 13 and the first protruding portion 14aD, the second protruding portion 14bD, the third protruding portion 14cD, and the fourth protruding portion. Consequently, the protruding portions having the hole portions formed therein improve the anchoring effect, thereby enabling improvement of the resistance against reflow soldering. In the fourth embodiment, the first protruding portion 14aD, the second protruding portion 14bD, the third protruding portion 14cD, and the fourth protruding portion each have the hole portion, but this invention is not limited thereto. In the fourth embodiment, for example, only the first protruding portion 14aD may have the hole portion. Further, the first protruding portion 14aD, the second protruding portion 14bD, the third protruding portion 14cD, and the fourth protruding portion may each have a plurality of hole portions or a different number of hole portions. In addition, the hole portions may have different shapes.

Fifth Embodiment

Figures 5A, 5B:
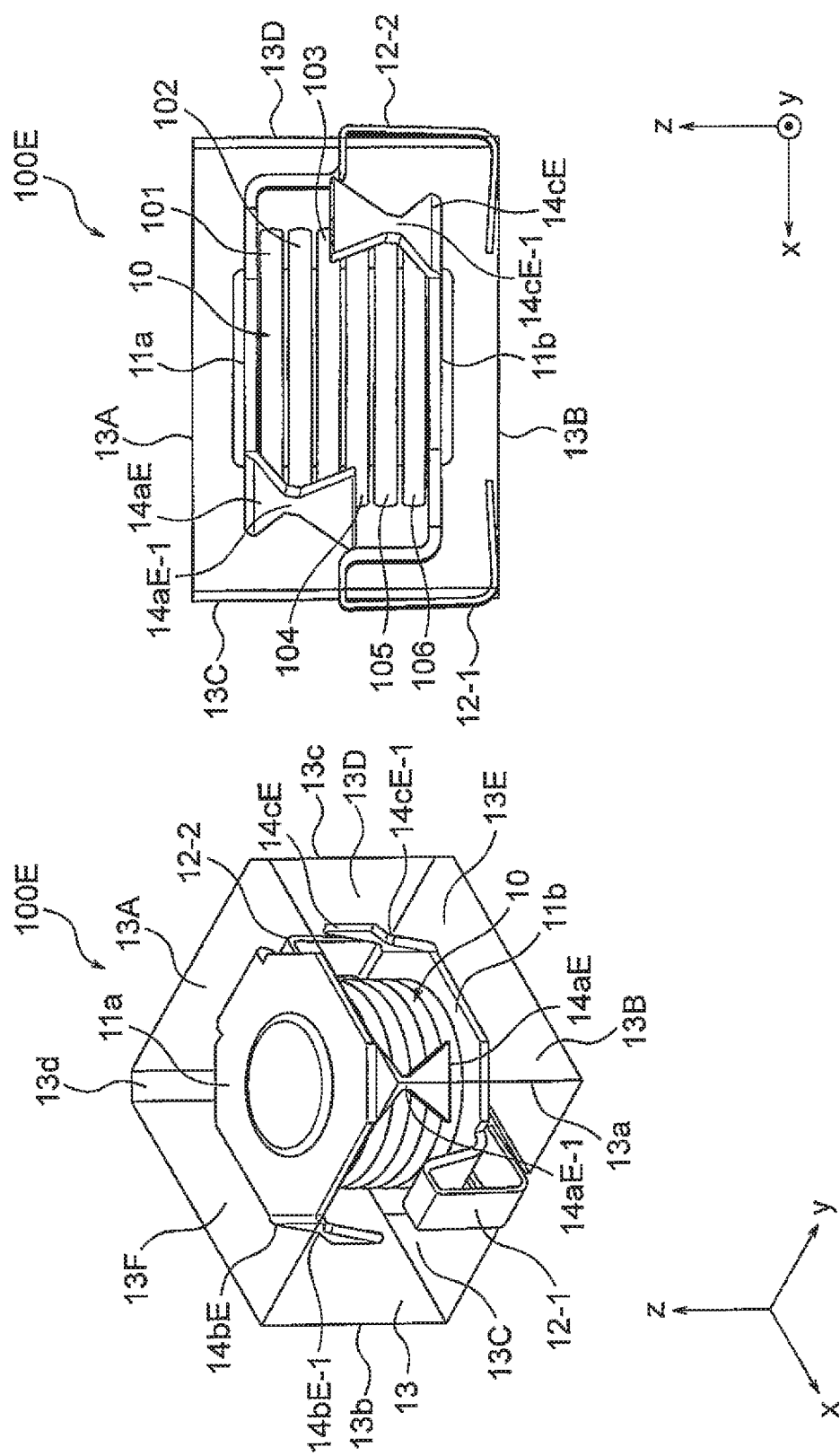
FIG. 5A and FIG. 5B are a perspective view and a cross-sectional transparent view, respectively, for schematically illustrating the configuration of an electric double-layer capacitor according to a fifth embodiment of this invention.

FIG. 5A and FIG. 5B are schematic views for illustrating the configuration of an electric double-layer capacitor 100E according to a fifth embodiment of this invention. FIG. 5A is a perspective view, and FIG. 5B is a cross-sectional transparent view of the electric double-layer capacitor 100E of FIG. 5A when viewed from the front and rear direction.

Here, as illustrated in FIG. 5A and FIG. 5B, an orthogonal coordinate system (x, y, z) is used. In the state illustrated in FIG. 5A and FIG. 5B, in the orthogonal coordinate system (x, y, z), the x-axis direction is the right and left direction (width direction), the y-axis direction is the front and rear direction (depth direction), and the z-axis direction is the up and down direction (height direction).

The electric double-layer capacitor 100E according to the fifth embodiment includes a capacitor element 10, a positive plate-like terminal portion 11a, a negative plate-like terminal portion 11b, a first lead-out terminal portion 12-1, a second lead-out terminal portion 12-2, an exterior body 13, a first protruding portion 14aE, a second protruding portion 14bE, a third protruding portion 14cE and a fourth protruding portion (not shown).

As in the second embodiment, the first protruding portion 14aE and the second protruding portion 14bE, each of which has a flat plate-like shape, are protruding portions of the positive plate-like terminal portion 11a that are formed to be inclined diagonally downward with respect to the positive plate-like terminal portion 11a. Specifically, the first protruding portion 14aE protrudes toward a front left edge 13a of the exterior body 13, and has a first narrowed portion 14aE-1 in which the first protruding portion 14aE is narrow in width on the sides. Further, the second protruding portion 14bE protrudes toward the rear left edge 13b of the exterior body 13, and has a second narrowed portion 14bE-1 in which the second protruding portion 14bE is narrow in width on the sides. As in the second embodiment, the third protruding portion 14cE and the fourth protruding portion, each of which has a flat plate-like shape, are protruding portions of the negative plate-like terminal portion 11b that are formed to be inclined diagonally upward with respect to the negative plate-like terminal portion 11b. Specifically, the third protruding portion 14cE protrudes toward a front right edge 13c of the exterior body 13, and has a third narrowed portion 14cE-1 in which the third protruding portion 14cE is narrow in width on the sides. Further, the fourth protruding portion protrudes toward a rear right edge 13d of the exterior body 13, and has a fourth narrowed portion (not shown) in which the fourth protruding portion is narrow in width on the sides. In short, the fifth embodiment is a mode in which each protruding portion of the second embodiment has a narrowed portion on the sides. With this configuration, large contact areas are secured between the exterior body 13 and the first protruding portion 14aE, the second protruding portion 14bE, the third protruding portion 14cE, and the fourth protruding portion. Consequently, the first protruding portion 14aE, the second protruding portion 14bE, the third protruding portion 14cE, and the fourth protruding portion having the narrowed portions formed thereto improve the anchoring effect, thereby enabling improvement of the resistance against reflow soldering. Further, in the fifth embodiment, the first protruding portion 14aE, the second protruding portion 14bE, the third protruding portion 14cE, and the fourth protruding portion each have the narrowed portion, but this invention is not limited thereto. In the fifth embodiment, for example, only the first protruding portion 14aE may have the narrowed portion. Further, the first protruding portion 14aE, the second protruding portion 14bE, the third protruding portion 14cE, and the fourth protruding portion may each have a plurality of narrowed portions or a different number of narrowed portions. In addition, the narrowed portion may be a cutout portion that is formed by cutting out only one side of each of the first protruding portion 14aE, the second protruding portion 14bE, the third protruding portion 14cE, and the fourth protruding portion.

Sixth Embodiment

FIG. 6A and FIG. 6B are schematic views for illustrating the configuration of an electric double-layer capacitor 100F according to a sixth embodiment of this invention. FIG. 6A is a perspective view, and FIG. 6B is a cross-sectional transparent view of the electric double-layer capacitor 100F of FIG. 6A when viewed from the front and rear direction.

Here, as illustrated in FIG. 6A and FIG. 6B, an orthogonal coordinate system (x, y, z) is used. In the state illustrated in FIG. 6A and FIG. 6B, in the orthogonal coordinate system (x, y, z), the x-axis direction is the right and left direction (width direction), the y-axis direction is the front and rear direction (depth direction), and the z-axis direction is the up and down direction (height direction).

The electric double-layer capacitor 100F according to the sixth embodiment includes a capacitor element 10, a positive plate-like terminal portion 11a, a negative plate-like terminal portion 11b, a first lead-out terminal portion 12-1, a second lead-out terminal portion 12-2, an exterior body 13, a first protruding portion 14aF, a second protruding portion 14bF, a third protruding portion 14cF, and a fourth protruding portion (not shown).

As in the second embodiment, the first protruding portion 14aF and the second protruding portion 14bF, each of which has a flat plate-like shape, are protruding portions of the positive plate-like terminal portion 11a that are formed to be inclined diagonally downward with respect to the positive plate-like terminal portion 11a. Specifically, the first protruding portion 14aF protrudes toward a front left edge 13a of the exterior body 13, and has a first uneven portion 14aF-1 on its surface. Further, the second protruding portion 14bF protrudes toward a rear left edge 13b of the exterior body 13, and has a second uneven portion 14bF-1 on its surface. As in the second embodiment, the third protruding portion 14cF and the fourth protruding portion, each of which has a flat plate-like shape, are protruding portions of the negative plate-like terminal portion 11b that are formed to be inclined diagonally upward with respect to the negative plate-like terminal portion 11b. Specifically, the third protruding portion 14cF protrudes toward a front right edge 13c of the exterior body 13, and has a third uneven portion 14cF-1 on its surface. Further, the fourth protruding portion protrudes toward a rear right edge 13d of the exterior body 13, and has a fourth uneven portion (not shown) on its surface. In short, the sixth embodiment is a mode in which each protruding portion of the second embodiment has an uneven portion formed on its surface. With this configuration, large contact areas are secured between the exterior body 13 and the first protruding portion 14aF, the second protruding portion 14bF, the third protruding portion 14cF, and the fourth protruding portion. Consequently, the first protruding portion 14aF, the second protruding portion 14bF, the third protruding portion 14cF, and the fourth protruding portion having the uneven portions formed thereon improve the anchoring effect, thereby enabling improvement of the resistance against reflow soldering. Further, in the sixth embodiment, the first protruding portion 14aF, the second protruding portion 14bF, the third protruding portion 14cF, and the fourth protruding portion each have three sets of uneven portions formed on its surface, but this invention is not limited thereto. In the sixth embodiment, for example, only the first protruding portion 14aF may have the uneven portion formed thereon. Further, the first protruding portion 14aF, the second protruding portion 14bF, the third protruding portion 14cF, and the fourth protruding portion each may have a different number of sets of uneven portions.

Next, with reference to FIG. 7A and FIG. 7B, stress that is generated in the embodiments of this invention is specifically described. FIG. 7A and FIG. 7B are schematic views for illustrating stress that is generated in the electric double-layer capacitor 100C according to the third embodiment of this invention.

Here, as illustrated in FIG. 7A and FIG. 7B, an orthogonal coordinate system (x, y, z) is used. In the state illustrated in FIG. 7A and FIG. 7B, in the orthogonal coordinate system (x, y, z), the x-axis direction is the right and left direction (width direction), the y-axis direction is the front and rear direction (depth direction), and the z-axis direction is the up and down direction (height direction).

As illustrated in FIG. 7A, when the electrolytic solution is boiled with heat in reflow soldering to increase the internal pressure of the capacitor element 10, the capacitor element 10 expands. Here, as illustrated in FIG. 7A and FIG. 7B, in the third embodiment, stress that is generated due to the expansion of the capacitor element 10 can be distributed to the first protruding portion 14aC and the second protruding portion 14bC. In addition, the first protruding portion 14aC and the second protruding portion 14bC protrude in the parts in which the mold strength is high. The resistance against reflow soldering of the electric double-layer capacitor 100C is therefore improved over the resistance against reflow soldering of the electric double-layer capacitor 100 according to the related technology. The description has been made based on the third embodiment, but the resistance against reflow soldering in the other embodiments is also improved over that of the electric double-layer capacitor 100 according to the related technology.

Example

Example of this invention is next described.

Figures 8A, 8B:
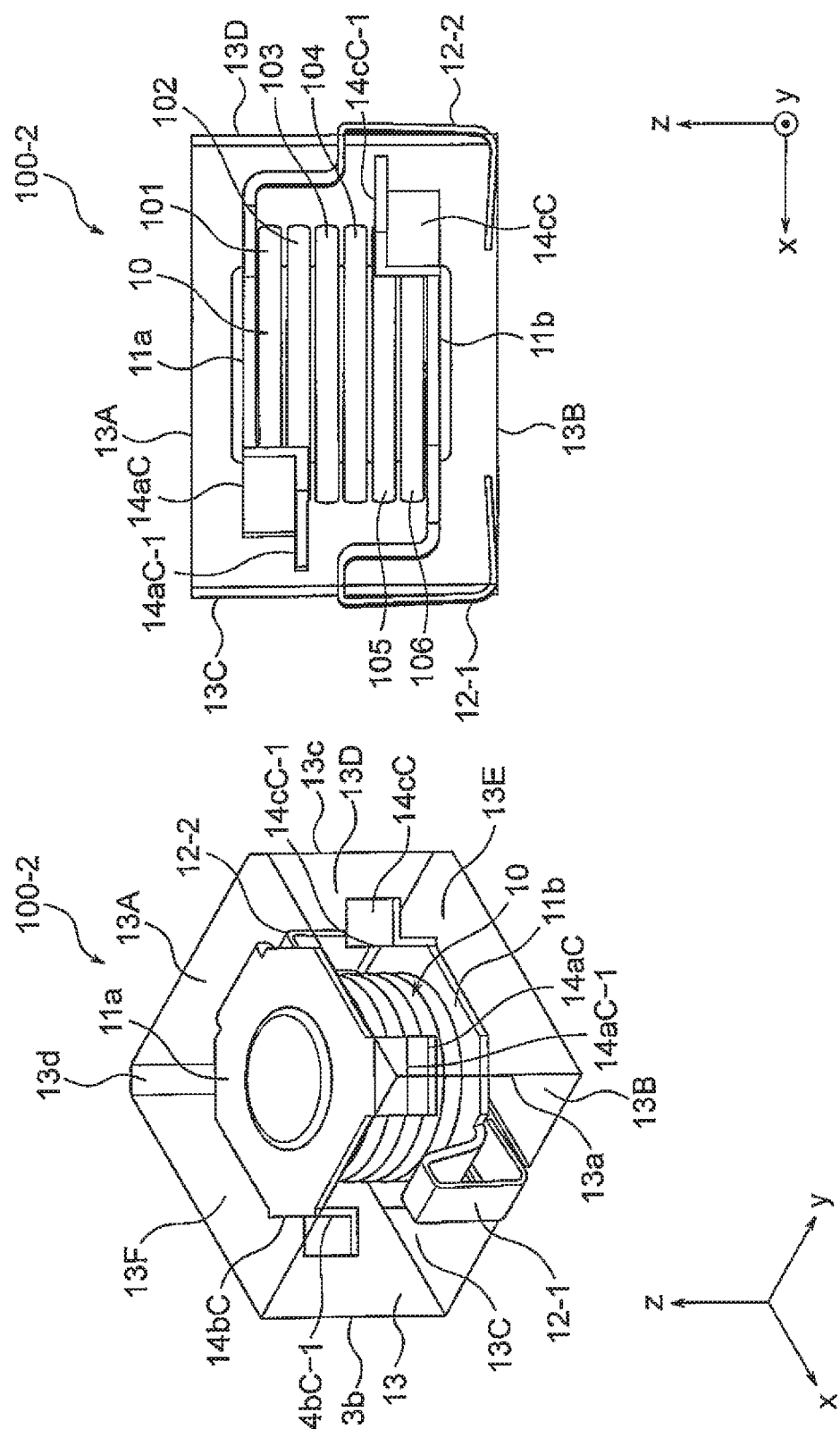
FIG. 8A and FIG. 8B are a perspective view and a cross-sectional transparent view, respectively, for schematically illustrating an electric double-layer capacitor according to Example of this invention.

FIG. 8A and FIG. 8B are schematic views for illustrating the configuration of an electric double-layer capacitor 100-2 according to Example of this invention. FIG. 8A is a perspective view, and FIG. 8B is a cross-sectional transparent view of the electric double-layer capacitor 100-2 of FIG. 8A when viewed from the front and rear direction. The electric double-layer capacitor 100-2 according to Example has a similar structure to that of the third embodiment of this invention. That is, the electric double-layer capacitor 100-2 includes a capacitor element 10, a positive plate-like terminal portion 11a, a negative plate-like terminal portion 11b, a first lead-out terminal portion 12-1, a second lead-out terminal portion 12-2, an exterior body 13, a first protruding portion 14aC, a second protruding portion 14bC, a third protruding portion 14cC, and a fourth protruding portion.

Here, as illustrated in FIG. 8A and FIG. 8B, an orthogonal coordinate system (x, y, z) is used. In the state illustrated in FIG. 8A and FIG. 8B, in the orthogonal coordinate system (x, y, z), the x-axis direction is the right and left direction (width direction), the y-axis direction is the front and rear direction (depth direction), and the z-axis direction is the up and down direction (height direction).

Figure 9:
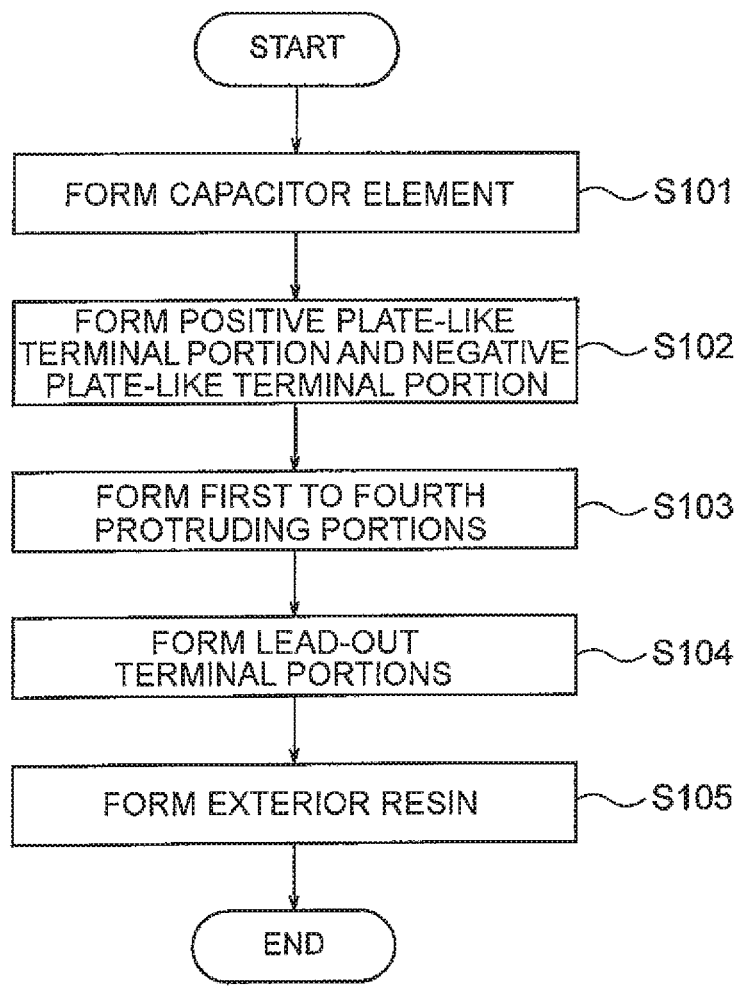
FIG. 9 is a flow chart for illustrating a method of manufacturing the electric double-layer capacitor according to Example of this invention.

FIG. 9 is a flow chart for illustrating a method of manufacturing the electric double-layer capacitor 100-2 according to Example of this invention. Now, the method of manufacturing the electric double-layer capacitor 100-2 is described with reference to FIG. 9.

First, the capacitor element 10 was produced by laminating the first unit cell 101, the second unit cell 102, the third unit cell 103, the fourth unit cell 104, the fifth unit cell 105, and the sixth unit cell 106 (Step S101). Here, the first unit cell 101 to the sixth unit cell 106 include activated carbon as the polarizable electrode, an aqueous sulfuric acid solution at a concentration of 50% as the electrolytic solution, polytetrafluoroethylene (PTFE) as the separator, butyl rubber of 0.38 mm as the gasket, and conductive rubber of 0.2 mm as the current collector. The capacitor element 10 having a diameter of 8.1 mm was produced.

Next, the positive plate-like terminal portion 11a, the negative plate-like terminal portion 11b, the first lead-out terminal portion 12-1, the second lead-out terminal portion 12-2, the first protruding portion 14aC, the second protruding portion 14bC, the third protruding portion 14cC, and the fourth protruding portion were formed using SUS with a thickness of 0.4 mm. Specifically, the positive plate-like terminal portion 11a and the negative plate-like terminal portion 11b were formed so that the positive plate-like terminal portion 11a and the negative plate-like terminal portion 11b have a width of 5.6 mm, and a distance of 10.0 mm was secured between the positive plate-like terminal portion 11a and the negative plate-like terminal portion 11b (Step S102). Next, the first protruding portion 14aC, the second protruding portion 14bC, the third protruding portion 14cC, and the fourth protruding portion were formed to have a length of 3.5 mm and a width of 1.5 mm (Step S103). Here, the first protruding portion 14aC and the second protruding portion 14bC were bent by 90° at the end surface of the positive plate-like terminal portion 11a with respect to the positive plate-like terminal portion 11a, and were further bent by 90° at positions 1.8 mm away from the end surface. In this way, the first bent portion 14aC-1 and the second bent portion 14bC-1 parallel to the positive plate-like terminal portion 11a were formed. Further, the third protruding portion 14cC and the fourth protruding portion were bent by 90° at the end surface of the negative plate-like terminal portion 11b with respect to the negative plate-like terminal portion 11b, and were further bent by 90° at positions 1.8 mm away from the end surface. In this way, the third bent portion 14cC-1 and the fourth bent portion parallel to the negative plate-like terminal portion 11b were formed. Next, the first lead-out terminal portion 12-1 and the second lead-out terminal portion 12-2 were bent by 90° at the end surfaces of the negative plate-like terminal portion 11b and the positive plate-like terminal portion 11a, respectively, and were further bent by 90° at positions 3.0 mm away from the plate-like terminal end surfaces (Step S104).

As the exterior body 13, PPS that contains 40% of a glass fiber was used. Specifically, the positive plate-like terminal portion 11a and the negative plate-like terminal portion 11b sandwiched the capacitor element 10 to compress the capacitor element 10 so that the capacitor element 10 had a thickness of 5.3 mm. The exterior body 13 was formed by performing injection molding under this state (Step S105).

Next, description will be made of comparison between the related Technology and the example.

Four electric double-layer capacitors 100 according to the related technology (Comparative Example) and four electric double-layer capacitors 100-2 according to Example were produced. The produced samples were subjected to a high-temperature resistance test to examine a damage temperature in reflow soldering. Specifically, a thermocouple was attached to the upper surface of each sample, and a temperature at which the sample was damaged was checked. In the high-temperature resistance test, a temperature rise rate was set to 1.3° C./sec. The results are shown in FIG. 10.

Figure 10:
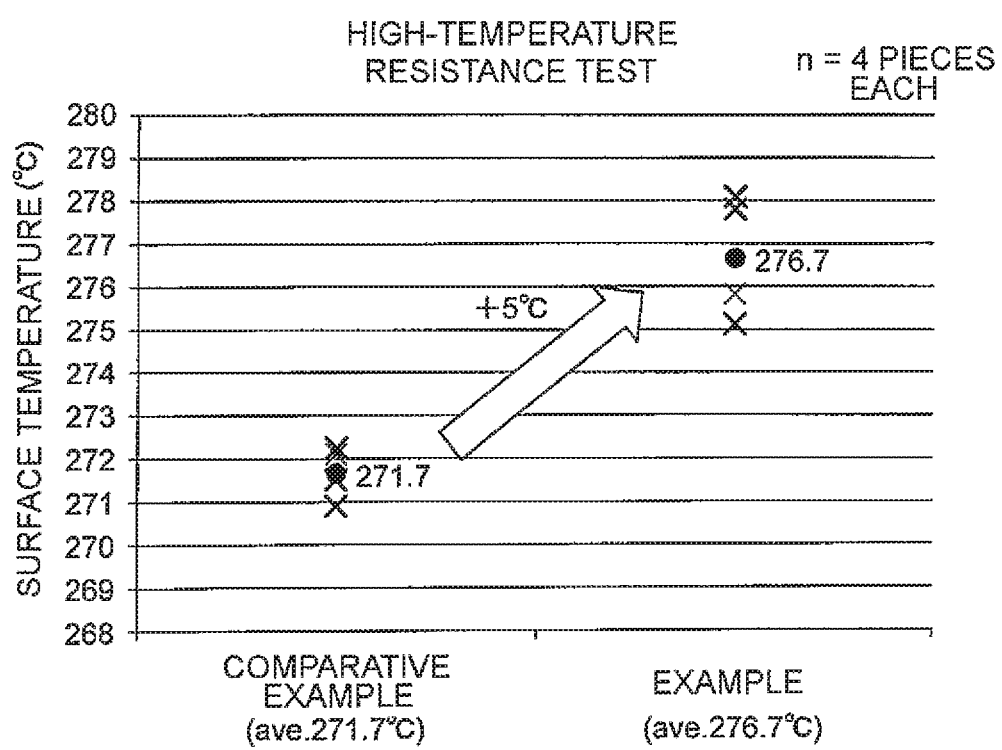
FIG. 10 is a graph for showing the results of a high-temperature resistance test of Example of this invention and Comparative Example.

As shown in FIG. 10, the average of damage temperatures of the electric double-layer capacitors 100-2 according to Example was 276.7° C. On the other hand, the average of damage temperatures of the electric double-layer capacitors 100 according to Comparative Example was 271.7° C. This means that the average of damage temperatures of the electric double-layer capacitors 100-2 according to Example of this invention is 5° C. higher than the average of damage temperatures of the electric double-layer capacitors 100 according to Comparative Example. This result shows that the electric double-layer capacitor 100-2 according to Example has the resistance against reflow soldering that is superior to that of Comparative Example although the method of manufacturing the electric double-layer capacitor 100-2 is almost the same as that of Comparative Example.

In the above, this invention is described based on the embodiments and Example, but the embodiments and Example described above are not intended to limit this invention. This invention can combine the above-mentioned embodiments, for example.

What is claimed is:

1. An electric double-layer capacitor, comprising:
    a capacitor element, which includes a positive electrode and a negative electrode that face each other in a predetermined direction;
    a positive plate-like terminal portion, which is connected to one end of the capacitor element in the predetermined direction;
    a negative plate-like terminal portion, which is connected to another end of the capacitor element in the predetermined direction; and
    an exterior body, which is configured to encapsulate the capacitor element, the positive plate-like terminal portion, and the negative plate-like terminal portion,
    wherein the positive plate-like terminal portion and the negative plate-like terminal portion include parts that face each other in the predetermined direction, and at least one protruding portion that protrudes from a corresponding one of the parts,
    wherein the protruding portion has a distal end portion that is located between a first surface that is orthogonal to the predetermined direction and includes an outermost portion of the positive plate-like terminal portion in the predetermined direction, and a second surface that is orthogonal to the predetermined direction and includes an outermost portion of the negative plate-like terminal portion in the predetermined direction, and
    wherein when a difference, in a plane orthogonal to the predetermined direction, between (i) a distance from a center of gravity of one of the positive plate-like terminal portion, the negative plate-like terminal portion, and the capacitor element to a peripheral surface of the one of the positive plate-like terminal portion, the negative plate-like terminal portion, and the capacitor element, and (ii) a distance from the center of gravity of the one of the positive plate-like terminal portion, the negative plate-like terminal portion, and the capacitor element to an exposed exterior body surface of the exterior body is defined as an exterior thickness, the protruding portion protrudes toward a corner of the exterior body and is located in a corner region that includes the corner and is between the center of gravity and a part of the exposed exterior body surface whose exterior thickness is larger than an average value of exterior thicknesses obtained around an entirety of the exterior body with the center of gravity being a reference in the plane.

2. The electric double-layer capacitor according to claim 1, wherein the at least one protruding portion is inclined with respect to the positive plate-like terminal portion and the negative plate-like terminal portion.

3. The electric double-layer capacitor according to claim 1, wherein the at least one protruding portion has at least one bent portion.

4. The electric double-layer capacitor according to claim 1, wherein the at least one protruding portion has at least one hole portion.

5. The electric double-layer capacitor according to claim 1, wherein the at least one protruding portion has at least one narrowed portion.

6. The electric double-layer capacitor according to claim 1, wherein the at least one protruding portion has an uneven portion on a surface thereof.

7. The electric double-layer capacitor according to claim 1, further comprising lead-out terminal portions different from the protruding portion,
    wherein only the protruding portion, from among the lead-out terminal portions and the protruding portion, is located in the corner region.

8. The electric double-layer capacitor according to claim 7, wherein the lead-out terminal portions are led out from side surfaces of the exterior body which face each other.

* * * * *